United States Patent
Portyrata

[11] 3,845,291
[45] Oct. 29, 1974

[54] WATER POWERED SWIMMING POOL LIGHT

[75] Inventor: Raymond E. Portyrata, North Haven, Conn.

[73] Assignee: Titan Tool and Die Company, Inc., Wallingford, Conn.

[22] Filed: Feb. 8, 1974

[21] Appl. No.: 440,832

[52] U.S. Cl. ................. 240/26, 73/229, 340/239 R
[51] Int. Cl. ......................................... F21v 31/00
[58] Field of Search ............ 240/26, 7.6; 340/239 R; 73/229

[56] References Cited
UNITED STATES PATENTS
1,560,535   11/1925   Burton ............................ 340/239 R FOREIGN PATENTS OR APPLICATIONS
893,556   4/1962   Great Britain ....................... 73/229

Primary Examiner—Robert P. Greiner

[57] ABSTRACT

A water powered light is provided which is particularly suited for use in association with a swimming pool to provide illumination thereto. The light includes a lamp assembly which is powered from a generator that is driven by a water powered turbine element. The lamp assembly includes a lens housing which is mountable in a swimming pool so as to project into the interior thereof. The lens housing provides a support for a light bulb. In addition, the lens housing is provided with water outlet means operable to enable water to exit from the light to the swimming pool. The light bulb is connected in electrical circuit relation with the generator. The latter generator includes a coil to which the light bulb is connected electrically in electrical circuit relation therewith. A shaft having a multipole magnet supported at one end thereof is mounted for rotation relative to the coil whereby the coil lies in the magnetic field produced by the magnet. The other end of the shaft has operatively connected thereto one of the elements of a turbine wheel, the latter including a plurality of rows of blades. Water which has been drawn from the swimming pool and passed through a filter is returned to the swimming pool through the light. This water is utilized to generate power to operate the light. More specifically, the water in its return path is caused to flow through the open end of the housing of the light whereupon it strikes the aforementioned blades of the turbine wheel. As the water strikes the latter blades, the force imparted thereby is sufficient to cause the shaft operatively connected thereto to rotate. This rotation in turn is imparted to the magnet supported at the other end of the shaft. The rotation of the shaft causes an electrical current to be generated in the coil. This electrical current flows through the electrical circuit in which the light bulb is connected and is sufficient to power the latter to provide illumination for the swimming pool.

10 Claims, 4 Drawing Figures

PATENTED OCT 29 1974　　　　3,845,291

WATER POWERED SWIMMING POOL LIGHT

BACKGROUND OF THE INVENTION

One of the operating requirements of essentially all swimming pools except for the relatively small play pools is that means be provided for enabling the water contained in the swimming pool to be filtered. To this end, in accord with the conventional mode of operation water is drawn from a swimming pool through a surface skimmer. From the latter skimmer, water flows into and through a filter and is returned to the swimming pool through an opening provided for this purpose in the side wall of the swimming pool at a point which is located below the surface of the water. More specifically, the water as it enters the swimming pool is generally caused to flow through a bulkhead fitting which is suitably mounted on the aforereferenced opening. Commonly, the latter fitting embodies a construction wherein a portion thereof within which a restrictor orifice is provided protrudes into the swimming pool. As a result, the exposed portion of the filter represents a potentially hazardous condition inasmuch as it could be the cause of injury to anyone coming into contact therewith. It is therefore desirable that some means be provided for returning the water to the swimming pool which would obviate the aforesaid hazard.

In addition to the operating requirement described in the preceding paragraph, it is also known to provide swimming pools and more particularly the in ground version thereof with means operable to illuminate the swimming pool. This practice exists irrespective of whether the swimming pool is installed within a building for year round usage, or whether the swimming pool is located outdoors and is intended in the northern climates to be utilized only during the summer months or in the southern climates for longer periods. By providing means to illuminate the swimming pool, it is possible to make more efficient usage thereof inasmuch as it is possible to extend the hours of operation of the swimming pool.

The manner by which the swimming pool is illuminated to accomplish the above requires not only that lights be provided externally of the swimming pool to light up the walk areas surrounding the periphery of the pool and the surface of the water in the pool, but also that means be provided for illuminating the water below the surface thereof. In this connection, the conventional practice has been to mount a multiplicity of individual lights in suitably spaced relation in the side walls of the swimming pool around the entire cimcumference thereof. The distance by which the light is positioned below the surface of the water in the swimming pool will, of course, vary depending upon the depth of water at that particular location of the swimming pool. Moreover, it may be found necessary at the deepest end of the pool wherein the diving boards are commonly provided to employ a plurality of sets of lights arranged in layers which are vertically spaced apart by a suitable distance.

For purposes of providing the electrical power supply which is required to power these lights, it has most often been the practice to connect these lights in electrical circuit relation with an external source of electrical current. Commonly, the latter external source has consisted of a tie in to the local power company's electrical transmission network. However, in some instances use has been made of a small generator which is powered by a suitable gasoline or diesel fueled motor to generate the electrical current required to power the lights. Irrespective of which of these forms of electrical current generating means are employed, it is necessary that all of the lights be interconnected by electrical wiring. In addition, electrical wiring must be provided between the lights and the source of electrical current. Consequently, it can be readily understood that it is relatively expensive to provide the aforesaid electrical circuitry required to provide the swimming pool with a capability for illuminating the latter. Moreover, the cost of maintaining the electrical circuitry in a safe and operable condition is relatively high by virtue of the deleterious environmental conditions in which the former is forced to function. Finally, the cost of providing an already existing swimming pool which has no lights with a lighting system is most often found to be prohibitive.

Thus, all of these factors have made it desirable to provide a lighting system for a swimming pool which would be operable to be mounted below the surface of the water in the side walls of the swimming pool to illuminate the water below the surface thereof, yet would obviate the necessity of providing an extensive amount of electrical wiring to accomplish this. Moreover, it would be desirable to provide such a lighting system which is not dependent on an external source for its power supply but rather embodies a self powering means. In addition, such a lighting system is desired which would be readily capable of being utilized to provide an all ready existing swimming pool with means operable to convert the latter from an unlighted pool to a pool which has the capability to be illuminated to permit the use thereof during evening hours, etc. Finally, obvious advantages are to be derived from providing a device which combines the capability of performing the aforereferenced illuminating function while yet also possessing the capability of serving as the means through which water being returned to the swimming pool from the filter, etc. reenters the pool, and a device which when mounted in an opening provided therefor in the side wall of a swimming pool below the surface of the water contained therein presents a substantially smooth surface operable to minimize the likelihood of injury being caused thereby as a result of a swimmer coming into contact therewith.

Accordingly, it is an object of the present invention to provide a novel and improved light which is particularly suited to be employed in a swimming pool.

It is another object of the present invention to provide such a light which is operable to provide illumination through the water below the surface level thereof in the swimming pool.

It is also an object of the present invention to provide such a light which in addition is operable as a means through which water drawn from the swimming pool is permitted to reenter the swimming pool.

Another object of the present invention is to provide such a light which is capable of being relatively easily installed in an already existing unlighted swimming pool to convert the latter to a swimming pool which possesses the capability of being illuminated.

A still further object of the present invention is to provide such a light which obviates the necessity of having electrical circuitry connected thereto.

Yet another object of the present invention is to provide such a light which possesses the capability of generating its own electrical power.

Yet a still further object of the present invention is to provide such a light which when mounted in the side wall of a swimming pool is characterized by its inherent safety which stems from the fact that only a limited portion thereof projects into the swimming pool and the portion thereof which does presents a relatively smooth surface having no sharp edges likely to cause injury to a swimmer coming in contact therewith.

Yet a still further object of the present invention is to provide such a light which is relatively inexpensive to provide, is not unduly susceptible to being harmed by virtue of exposure to the environmental conditions in which it is required to function and is capable of providing a relatively long, trouble-free operating life.

SUMMARY OF THE INVENTION

It has now been found that the foregoing and related objects can be readily attained in a water powered light which is particularly suited for use in association with a swimming pool to provide illumination thereof. The principal components of the light include a lamp assembly, generator means operable for generating electrical current to power the light, and a water powered turbine wheel element which is operable in turn to drive the generator means. The lamp assembly includes a lens housing which is operable for mounting the light in a side wall of the swimming pool below the normal surface of the water contained therein. The lens housing also provides a support for a light bulb, which is connected in electrical circuit relation with the generator means. In addition, the lens housing is provided with an opening formed therein which functions as an outlet for water which is made to flow through the light as it is being returned to the swimming pool after having been drawn therefrom and passed through a filter, etc. The generator means is supported within the light in juxtaposed relation to the base of the light bulb. The generator means includes a stationary coil to which the light bulb is connected electrically. Mounted on one end of a shaft which extends to a position which is adjacent to the location of the aforesaid coil is a multipole magnet. The latter magnet is mounted on the shaft so as to be rotatable therewith and so that the coil lies in the magnetic field produced by the magnet. At its other end, the shaft has received thereon a propellor which comprises one of the components of the turbine wheel element. The propellor has formed thereon a multiplicity of blades which extend outwardly thereof radially and which are fixedly mounted thereon. The other component of the turbine wheel element comprises a stator which is located adjacent to the end of the shaft upon which the propellor is mounted. The statar is also provided with a multiplicity of fixedly mounted blades extending radially outwardly therefrom. Finally, the end of the light adjacent to where the stator is located is preferably open to provide an inlet for water flowing through the light. The manner in which the light functions is as follows. Water which has been drawn from the swimming pool for purposes of being passed through a filter, etc. is made to flow through the light. The latter light when mounted in the side wall of a swimming pool possesses the additional capability of serving as the means through which the water reenters the pool. The water as it enters the light strikes the blades of the stator. The latter functions as a turning vane which is operable to cause the water to change direction and be redirected so as to strike the blades of the propellor at the most efficient angle. The force of the water striking the blades of the propellor is sufficient to cause the propellor to rotate. Since the propellor is fixedly mounted to the shaft, rotation of the former results in rotation also of the latter. Moreover, as the shaft rotates, the generator carried thereby rotates relative to the coil. This results in an electrical current being generated. This electrical current flows in the electrical circuit in which the light bulb is electrically connected and is sufficient to cause the light bulb to become lit. Insofar as concerns the remaining portion of the flow path of the water flowing through the light, after striking the blades of the propellor the water then flows around the exterior of the generator means to the outlet port formed in the lens housing through which the water reenters the swimming pool.

In accord with the preferred form of the invention, the lamp assembly includes a lens which fits over a reflector at the center of which there is positioned a light bulb. The latter subassembly is in turn mounted in a fitting which functions generally as the housing for the light. The fitting in turn is mounted in a suitable opening provided therefor in the side wall of a swimming pool. A gasket is preferably interposed between the inner surface of the fitting and the outer surface of the side wall of the swimming pool to provide a seal therebetween. A threaded nut is employed in accord with the preferred embodiment of the invention to securely position the light in the aforedescribed opening in the side wall of the swimming pool. To this end, the fitting is also provided with threads to enable the aforesaid nut to be threadedly engaged therewith whereby a portion of the side wall of the swimming pool is captured between the aforedescribed gasket on one side and the threaded nut on the other side. The generator means includes a coil having a central aperture formed therein in which the base of the light bulb is provided. Adjacent to the coil there extends one end of a shaft. The latter end of the shaft has supported thereon for rotation therewith a four pole magnet. As the magnet is caused to rotate relative to the coil, an electrical current is produced in the coil. The other end of the shaft passes through an opening provided therefor in the center of the propellor. In the recessed portion of the propellor, a spring is located which surrounds a portion of the shaft. The latter spring is operable to apply a biasing force against the shaft. The other end of the shaft extends into a suitably dimensioned opening formed in the inner end of the stator.

DETAILED DESCRIPTION OF THE ILLUSTRATED EMBODIMENT

Figure 1:
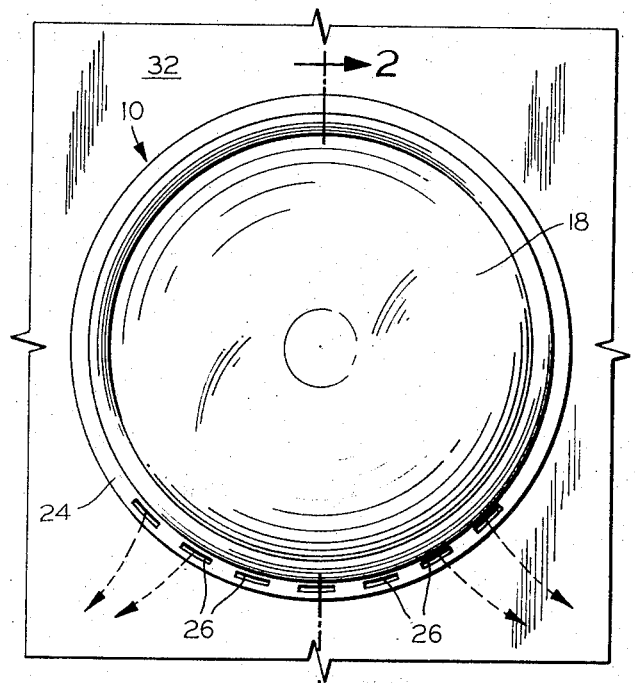
FIG. 1 is a front view of a light constructed in accordance with the present invention illustrated mounted in the side wall of a swimming pool.
Figure 2:
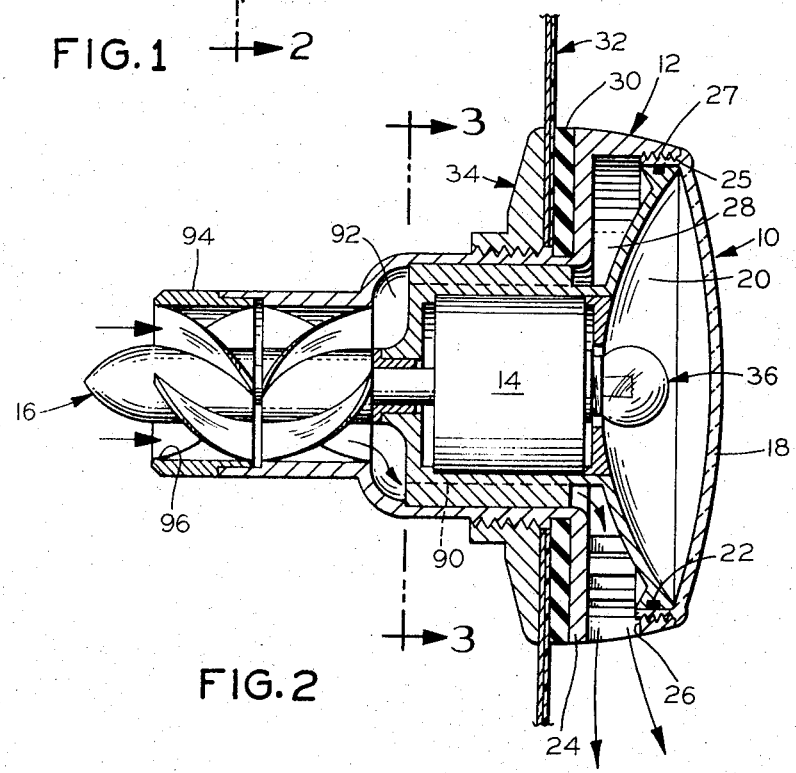
FIG. 2 is a cross sectional view of a light constructed in accordance with the present invention mounted in the side wall of a swimming pool taken substantially along the line 2—2 in FIG. 1.

Referring now to the drawings and more particularly FIGS. 1 and 2 thereof, there is illustrated therein a light, generally designated by reference numeral 10, constructed in accordance with the present invention which is particularly suited to be employed in association with a swimming pool to provide illumination of the water contained therein. As depicted in the drawings, the light 10 is mounted in a suitably dimensioned opening (not shown) provided therefor in the side wall 32 of a swimming pool. The light 10 includes a lamp assembly 12, generator means 14 and a turbine wheel element assembly 16.

The lamp assembly 12 includes a lens 18 which in accord with the preferred form of the invention is made from clear acrylic. The lens 18 as depicted in the drawings has a slight convex curvature. Associated with the lens 18 is a reflector 20 formed of plastic. The reflector 20 embodies the conventional concave configuration which is characteristic of elements that are employed as reflectors. Interposed between the rim of the reflector 20 and the inner periphery of the lens 18, there is preferably provided a gasket 22 formed of a suitable resilient material. The gasket 22 functions to ensure that a water tight seal is formed therebetween.

As best understood with reference to FIG. 2 of the drawings, the subassembly comprising the lens 18 and reflector 20 are in turn mounted in the fitting 24. The latter fitting 24 functions generally as a housing for the various components which comprise the light 10. Insofar as concerns the nature of the construction of the fitting 24, the latter is provided with an open and suitably dimensioned so that the aforedescribed subassembly of lens 18 and reflector 20 may be inserted therein and retained suitably mounted in an assembled condition with the fitting 24 through the threaded engagement of the threads 25 of the fitting 24 and the threads 27 of the lens 18. In addition, the fitting 24 is provided with a longitudinally extending body portion of lesser diameter than the aforesaid open end thereof. The latter body portion functions as a housing for the generator means 14, to which further reference will be had subsequently. Also, as shown in FIG. 2, the other end of the fitting 24 is open providing an inlet through which water being returned to the swimming pool enters the light 10. The fitting 24 is preferably made of plastic. As best understood with reference to FIG. 1 of the drawings, the fitting 24 is provided with a plurality of openings 26 suitably arranged in spaced relation around a portion of the periphery of the open end of the fitting 24 into which the lens 18 and reflector 20 are mounted. These openings 26 function as a means of permitting water to reenter the swimming pool after being caused to flow through the light in the course of the water returning to the swimming pool after the water has been withdrawn from the pool such as by means of a surface skimmer and circulated through some form of filtering device. It will be noted with reference to FIG. 2 of the drawings that a chamber exists in the fitting 24 formed by the side walls of the latter and the reflector 20. The latter chamber 28 is in fluid communication with the outlet ports 26 thereby enabling water to flow from the chamber 28. The manner in which the water flows through the light 10 to the chamber 28 and therefrom to the outlet ports 26 so as to exit from the light 10 through the latter will be described subsequently.

Referring again to FIG. 2 of the drawings, it will be noted therefrom that the fitting 24 is provided intermediate its ends with a plurality of external threads. The latter threads as shown in the aforementioned figure of the drawings are employed for mounting the fitting 24 and more particularly the light 10 in the opening provided therefor in the side wall 32 of the swimming pool. To this end, a gasket 30 is preferably positioned in abutting engagement with the inner surface of the side wall 32 of the swimming pool whereby the gasket 30 serves to encircle the opening in the swimming pool side wall 32 in which the light 10 is mounted. With the gasket 30 so mounted, the fitting 24 is inserted through the gasket 30 and the opening in the swimming pool side wall 32 whereby the gasket 30 is interposed between the swimming pool side wall 32 and a surface of the fitting 24. To retain the fitting 24 securely mounted in the aforedescribed position, a nut 34 is preferably threadedly engaged with the external threads formed on the body portion of the fitting 24. The nut 34 is securely tightened thereon so as to cause the side wall 32 of the swimming pool to be captured between the nut 34 and the gasket 30.

Turning next to a consideration of the construction of the generator means 14, the latter is positioned within the light 10 so as to be readily accessible for connection in electrical circuit relationship with a light bulb 36. The light bulb 36 is suitably retained mounted in an opening provided therefor in the reflector 20. In accord with the illustrated embodiment of the invention, the reflector is of two-part construction. More particularly, the reflector 20 consists of a concave member having a longitudinally extending portion received within and extending coaxial with the body portion of the fitting 24. The generator means 14 is located within the body portion of the concave reflector member 20. The member 20 in turn has a relatively large opening formed centrally thereof into which a reflector portion 29 is inserted. It is actually the latter reflector portion 29 which is provided with the opening through which the bulb portion of the light bulb 36 extends.

Figure 4:
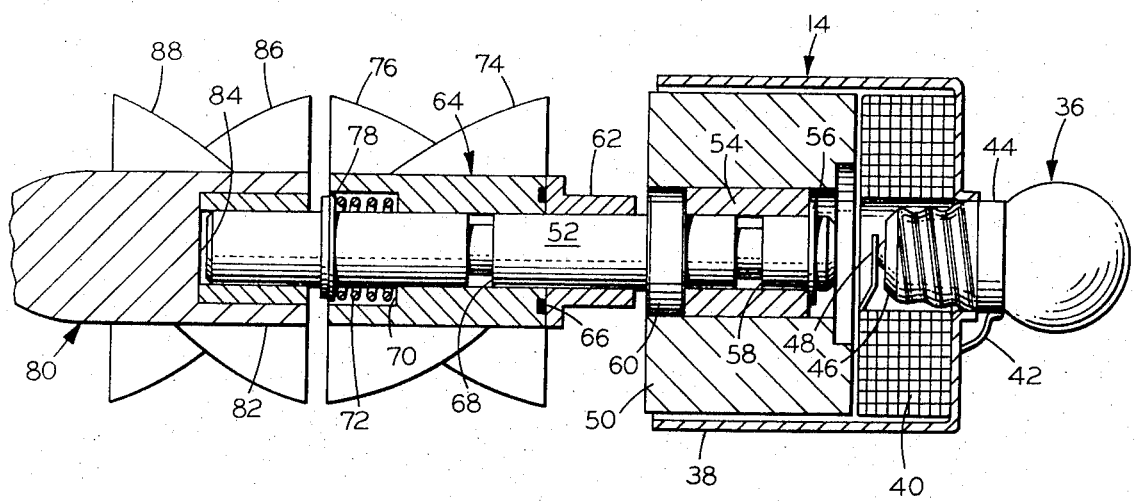
FIG. 4 is a side elevational view partially in section and with parts broken away for purposes of maintaining clarity of illustration of the generator means and turbine wheel element assembly of a light constructed in accordance with the present invention.

Continuing now with the description of the generator means 14, reference will be had for this purpose to FIG. 4 of the drawings. As depicted therein, the generator means 14 includes a housing 38 of generally cylindrical configuration. The base portion of the light bulb 36 is supported on the housing 38 so as to extend into the interior thereof through an opening provided therefor in one end of the housing 38. In this connection, any suitable means may be utilized to retain the light bulb 36 so positioned such as for example, by relying on the existence of a friction fit therebetween. Adjacent to the latter opening, a stationary coil 40 is suitably provided within the housing 38. The coil 40 is connected in electrical circuit relation with the light bulb 36 in the following manner. A tab 42 is provided which is connected at one end to the coil 40 and at the other end to the portion 44 of the light bulb 36. To complete the electrical circuit between the coil 40 and the light bulb 36, the base 46 of the latter is connected to the coil 40 by means of a second tab 48, the opposite ends of which are suitably affixed to the coil 40 and base 46, respectively.

Located adjacent to the coil 40 within the housing 38 is a magnet 50 having a generally circular configuration. In accord with the preferred embodiment of the invention, the magnet 50 comprises a four pole ceramic magnet having the poles arranged thereon in accordance with the conventional practice well-known to those skilled in the art so that the coil 40 is positioned within the magnetic field produced by the magnet 50. The magnet 50 is supported within the housing 38 so as to be rotatable relative to the coil 40. More particularly, the magnet 50 and the coil 40 are cooperatively associated within the housing 38 of the generator means 14 in a manner well-known to those skilled in the art so that as relative rotation takes place between the coil 40 and the magnet 50 an electrical current is caused to be produced in the coil 40. To enable the magnet 50 to rotate relative to the coil 40, the former is preferably fixedly mounted on one end of the shaft 52, the latter being supported within the light 10 so as to extend along the major axis thereof. More specifically, there is interposed between the shaft 52 and the magnet 50 carried thereon, a tubular member 54 which in accord with the preferred embodiment of the invention is made of plastic. The latter member 54 is suitably dimensioned so that the inner diameter thereof corresponds to the external diameter of the shaft 52 whereby the member 54 is capable of being mounted on the shaft 52 by means of a slip fit. Similarly, the external diameter of the member 54 corresponds to the diameter of the opening formed through the center of the magnet 50 whereby the magnet 50 and the member 54 are capable of being assembled together by means of a press fit.

With further reference to the nature of the construction of the shaft 52, the latter at the end thereof which extends into the housing 38 is preferably provided with a groove (not shown). The latter groove is operable to receive therein a washer-like member 56. The latter member 56 has a diameter which exceeds the inner diameter of the member 54. Accordingly, when the washer-like member 56 is assembled on the shaft 52, the former functions as a stop to limit the extent of axial movement that is possible between the shaft 52 and the member 54 and magnet 50 carried thereon. Spaced inwardly of the washer-like member 56 the shaft 52 is further provided with another groove, i.e., groove 58. The latter groove 58 may be utilized for purposes of receiving therein a suitable member (not shown) operable to provide a function drive between the shaft 52 and the inner surface of the tubular member 54. In addition, a ball thrust bearing 60 is received on the shaft 52 so as to be located thereon in spaced relation to the aforementioned groove 58. As best understood with reference to FIG. 4 of the drawings, the bearing 60 is suitably dimensioned so that the external diameter thereof corresponds to the inner diameter of the member 54 whereby the bearing 60 is capable of being positioned therewithin. Between the portion of the shaft 52 which extends into the generator means 14 and the portion thereof which extends into the turbine wheel element assembly 16, the shaft 52 preferably passes through a bearing 62. The latter bearing 62 provides a support for the shaft 52 intermediate the ends thereof as well as functioning as a seal face with the turbine wheel assembly 16 and more particularly the end face of the propellor 64. In addition, it will be noted particularly with reference to FIG. 2 of the drawings, that the bearing and seal face 62 is externally configured in such a manner as to be provided with a longitudinally extending portion thereof which is of reduced diameter. The latter portion is suitably dimensioned so as to be receivable within the open end of the body portion of the concave reflector member 20 and thereby serves as a closure therefor.

Turning now to a description of the turbine wheel assembly 16, the latter in accord with the illustrated embodiment of the invention is of multi-part construction. In this regard, one of the components thereof comprises the propellor 64. The latter propellor 64 includes a longitudinally extending body portion which has an opening formed essentially therethrough. The latter opening is suitably dimensioned so as to permit a portion of the shaft 52 to extend therethrough. Preferably a suitable seal face 66 which may take the form of a gasketed ceramic component is received in an opening (not shown) provided therefor in the end of the propellor 64 which lies most closely adjacent to the generator means 14. The seal face 66 is located so as to be engageable with the bearing 62 whereby to provide a rotary seal therebetween. It will be noted with reference to FIG. 4 of the drawings that the portion of the shaft 52 which extends through the propellor 64 is provided with another groove, i.e., groove 68 which is similar in construction to the groove 58 previously described hereinabove. The groove 68 is capable of receiving therein a suitable member (not shown) which is operable for purposes of providing a seal between the shaft 52 and the propellor 64 as well as to provide a friction drive therebetween. At its other end, the propellor 64 is provided with a recessed area 70. A spring 72 is positioned in the recessed area 70 so that it surrounds a portion of the shaft 52 and with one end of the spring 72 bearing against the end wall of the recessed area 70 and with the other end of the spring 72 bearing against a ring-like member 78 which is suitably provided on the shaft 52 intermediate the ends thereof. Consequently, it can be readily understood with reference to FIG. 4 of the drawings, that the spring 72 functions to apply a biasing force to the shaft 52 causing the latter to be biased towards the left as viewed with reference to FIG. 4 of the drawings whereby the washer-like member 56 remains in engagement with the tubular element 54. As depicted in both FIGS. 2 and 4 of the drawings, the propellor 64 includes a plurality of blades 74 and 76 which extend outwardly radially of the body portion of the propellor 64. The latter blades 74 and 76 are suitably arranged in spaced relation around the circumference of the body portion of the propellor 64. The blades 74 and 76 extend substantially the entire length of the propellor 64 and project outwardly to a suitable distance whereby to be dimensioned so that the propellor 64 when supported on the shaft 52 is capable of being received within the body portion of the fitting 24. As described hereinabove, the propellor 64 is mounted on the shaft 52 so as to be rotatable therewith and with the tips of the blades 74 and 76 rotating adjacent to but spaced from the inner surface of the longitudinally extending body portion of the fitting 24.

The other primary component of the turbine wheel element assembly 16 consists of the stator 80. The latter embodies a construction similar to that of the propellor 64, and is intended to cooperate therewith in a manner yet to be described. The essential difference between the stator 80 and the propellor 64 is that whereas the latter is mounted on the shaft 52 so as to be rotatable therewith, the stator 80 on the other hand is supported within the light 10 so as to enable relative movement to occur between the shaft 52 and the stator 80. The stator 80 operates as a turning vane to change the direction of flow of the water as it enters the light 10 to cause the water to be directed at the rotating blades 74 and 76 of the propellor 64 at the angle most efficient to produce the desired rotation of the propellor 64. To enable relative movement to occur between the shaft 52 and the stator 80, the latter is provided with a recessed area 84 into which the end of the shaft 52 extends. In a manner similar to the propellor 64, the stator 80 is also provided with a plurality of blades 86 and 88. The latter blades 86 and 88 terminate short of the end of the stator 80 and project outwardly of the body portion of the stator 80 to a suitable distance whereby to enable the stator 80 to be received within the interior of the light 10.

Figure 3:
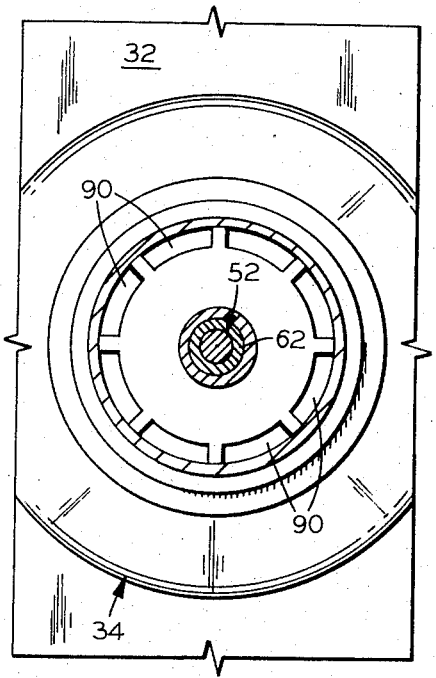
FIG. 3 is a cross sectional view of a light constructed in accordance with the present invention mounted in the side wall of a swimming pool taken substantially along the line 3—3 in FIG. 2.

Regarding the path of flow of water through the light 10, as described previously the water flows into the light 10 through the open end 96, i.e., the left end thereof as viewed with reference to FIG. 2 of the drawings. In accord with the illustrated embodiment of the invention, the light 10 at the left end thereof as viewed with reference to FIG. 2 of the drawings is preferably provided with an extension 94 suitably joined in any conventional manner to the fitting 24. The extension 94 is of generally cylindrical configuration and functions to encircle the blades 86 and 88 to form open-ended chambers therebetween through which the water is capable of flowing. Upon entering the light 10, the water strikes the blades 86 and 88 of the stator 80. As a result of the latter action, the direction of flow of the water is changed. More particularly, the water is directed by the blades 86 and 88 of the stator 80 which functions as a turning vane so that the water is caused to strike the blades 74 and 76 of the propellor 64 at the angle which is most efficient to produce the desired rotation of the propellor 64. After leaving the blades 74 and 76 of the propellor 64 the water flows into the chamber 92 which is created between the left end of the body portion of the reflector member 20 as viewed with reference to FIG. 2 of the drawings and the inner surface of the body portion of the fitting 24 when the latter two members are in their assembled condition. From the chamber 92, the water flows through suitably dimensioned longitudinally extending openings 90 formed around the circumference of the concave reflector member 20, as best understood with reference to FIGS. 2 and 3 of the drawings, and into the chamber 28. From the chamber 28 the water flows through the outlet ports 26 and reenters the swimming pool.

The mode of operation of the light 10 will now be set forth. The light 10 in the manner depicted in the drawings is designed to be mounted in the opening which is provided in the side wall of the swimming pool for the purpose of permitting the reentry into the swimming pool of the water which has been withdrawn from the pool and circulated through an externally located filtering device. The latter opening is suitably located such that when the light 10 is mounted therein, the latter is located below the surface of the water contained in the swimming pool. With the light 10 so mounted, water which is being returned to the swimming pool is caused to flow into the open end 96 of the light 10 whereupon it strikes the blades 86 and 88 of the stator 80. As a result of the water striking the latter blades, the direction of flow of the water is changed whereupon the water is directed in such a manner as to strike the blades 74 and 76 of the propellor 64 at the most efficient angle. The force produced by the water striking the blades 74 and 76 is sufficient to cause the latter and more particularly, the propellor 64 on which the blades 74 and 76 are mounted to rotate. As the propellor 64 rotates, since it is fixedly mounted to the shaft 52 the latter is also caused to rotate. In turn, as the shaft 52 rotates the magnet 50 carried at the other end thereof also rotates. Since the coil 40 is supported within the light 10 so as to lie within the magnetic field produced by the magnet 50, as the latter rotates the lines of flux of the magnetic field thereof are cut by the coil 40. Consequently, in a manner well-known to those skilled in the art, an electrical current is produced in the coil 40. This electrical current flows through the electrical circuit which is provided between the coil 40 and the light bulb 36 and is operable to cause the light bulb to go ON. The light from the bulb 36 is reflected and passes through the lens 18 into the swimming pool wherein it is operable to illuminate at least that portion of the water contained in the swimming pool which adjoins the location whereat the light 10 is mounted in the swimming pool side wall 32. To shut off the light 10, it is merely necessary to interrupt the flow of water through the light 10. More particularly, when the flow of water is interrupted the rotation of the propellor 64 stops and with it the rotation of the shaft 52. Accordingly, the magnet 50 also stops rotating whereby an electrical current ceases to be produced in the coil 40 and thereby causes the light bulb 36 to be extinguished. It should also be noted at this point, that a pressure drop occurs as the water flows through the light 10, and that the outlet ports 26 function in the nature of restrictive orifices operable to restrict the flow of water as it reenters the swimming pool.

Although only one embodiment of a light particularly suited to be associated with a swimming pool to provide illumination thereto constructed in accordance with the present invention has been shown in the drawings and described hereinabove, it is to be understood that other modifications in the construction thereof may be made thereto by those skilled in the art without departing from the essence of the invention. In this connection, some of the modifications which can be made in the light 10 have been alluded to hereinabove while others will become readily apparent to those skilled in the art when exposed to the present description and illustration of the construction of the light 10. For example, although the reflector 20 has been described hereinabove as being of two-part construction, obviously the reflector 20 could take some other form without departing from the essence of the invention. Similarly, the assembly of the lens 18 and the reflector 20 could likewise be accomplished in some other manner without departing from the essence of the invention. In addition, some other means rather than the engagement of the nut 34 with the threads provided on the exterior of the fitting 24 could be employed for purposes of securely mounting the light within an opening in the side wall of a swimming pool. Insofar as concerns the propellor 64 and the stator 80, the blades thereof could obviously be of different configurations and the number thereof could also differ from that shown in the drawings as long as the construction thereof remains such that when water strikes against the blades of the propellor the force produced by the water striking thereagainst is sufficient to cause the propellor to rotate. Furthermore, the magnet 50 and the coil 40 could embody different constructions as long as the relative relationship therebetween remains such that when relative rotation occurs between the magnet 50 and the coil 40 an electrical current is produced in the coil 40. Finally, the light bulb 36 could be connected in electrical circuit relation with the coil 40 in some other manner without departing from the essence of the invention.

Thus, it can be seen that the present invention provides a novel and improved light which is particularly suited to be employed in a swimming pool. The light of the present invention is operable to provide illumination through the water below the surface thereof in the swimming pool. Moreover, a light has been provided in accord with the present invention which in addition is operable as a means through which water drawn from the swimming pool is permitted to reenter the swimming pool. The light of the present invention is capable of being relatively easily installed in an all ready existing unlighted swimming pool to convert the latter to a swimming pool which possess the capability of being illuminated. Also, the light of the present invention obviates the necessity of having electrical circuitry connected thereto. Also, in accord with the present invention a light has been provided which possesses the capability of generating its own electrical power from the water flowing through the normal filter circulation circuit of the swimming pool. In addition, a light has been provided which when mounted in the side wall of a swimming pool is characterized by its inherent safety which stems from the fact that only a limited portion thereof projects into the swimming pool and the portion thereof which does presents a relatively smooth surface having no sharp edges likely to cause injury to a swimmer coming in contact therewith, and by virtue of the fact that no external electrical circuitry is connected thereto which could possibly result in the establishment of an electrical condition sufficiently hazardous to present a possibility of someone being electrocuted as a result thereof. Finally, a light has been provided in accord with the present invention which is relatively inexpensive to provide, is not unduly susceptible to being harmed by virtue of the exposure to the environmental conditions in which it is required to function, and is capable of providing a relatively long, trouble-free operating life.

Having thus described the invention, I claim:

1. A self-powered light particularly adapted for use in a swimming pool to provide illumination thereof comprising:
    a. a housing having intake means formed therein at one end thereof operable to permit fluid to flow into the light, passage means provided in the interior of said housing connected at one end in fluid flow relationship with said intake means, and outlet means formed in said housing at the other end thereof connected in fluid flow relationship with the other end of said passage means operable to permit fluid to exit from the light;
    b. a lamp assembly mounted in said housing at said other end thereof including reflector means, a light bulb supported in said reflector means, and a lens operatively connected to said reflector means operable as a cover therefor;
    c. generator means supported in said housing in proximity to said lamp assembly including magnetic means and coil means supported for rotation relative to each other, and electrical circuit means connecting said coil means and said light bulb in electrical circuit relationship, said magnetic means being operable to produce a magnetic field, said coil means being positioned in said magnetic field wherein when relative rotation of said magnetic means and said coil means occurs an electrical current is produced in said coil means and is provided through said electrical circuit means to said light bulb to turn said light bulb ON;
    d. shaft means supported in said housing for rotation relative thereto having one of said magnetic means and said coil means mounted thereon at one end thereof for rotation therewith; and
    e. a turbine wheel assembly supported within said housing at said one end thereof including propellor means mounted on said shaft means at the other end thereof for rotation therewith, said propellor means including blade means provided on the periphery thereof so as to be in the path of flow of fluid through said housing wherein the force of fluid striking said blade means is operable to cause said propellor means and thereby said shaft means to rotate within said housing.

2. The light as set forth in claim 1 wherein said housing further comprises mounting means formed on the periphery thereof intermediate the ends thereof operable for receiving a fastener in engagement therewith to mount the light within a side wall of a swimming pool.

3. The light as set forth in claim 1 wherein said intake means comprises the open end of said housing at said one end thereof, and said outlet means comprises at least one inlet port formed around a portion of the rim defining said other end of said housing.

4. The light as set forth in claim 1 wherein said shaft means comprises an elongated shaft supported in said housing coaxially with the major axis of the light.

5. The light as set forth in claim 1 wherein said coil means comprises a coil fixedly mounted within the light, and said electrical circuit means includes a pair of tabs each having one end thereof connected to a portion of said light bulb and the other end thereof connected to a portion of said coil.

6. The light as set forth in claim 1 wherein said magnetic means comprises a four-pole ceramic magnet mounted on said shaft means for rotation therewith.

7. The light as set forth in claim 1 wherein said turbine wheel assembly further includes a stator supported in said housing against rotation relative thereto adjacent to said propellor means, said stator having a plurality of blades provided on the periphery thereof extending radially thereof arranged so as to be positioned in the path of flow of fluid through said housing wherein fluid entering said housing strikes said plurality of blades of said stator and is directed at the most efficient angle against said blade means of said propellor means from whence the fluid flows through said housing and exits into the swimming pool through said outlet means.

8. A water-powered light particularly adapted for use in a swimming pool to provide illumination thereof comprising:

a. a housing having a multiplicity of outlet ports formed therein at one end thereof operable to permit water to flow from the light into the swimming pool, passage means provided in the interior of said housing connected at one end in fluid flow relationship with said multiplicity of outlet ports, and intake means formed in said housing at the other end thereof connected in fluid flow relationship with the other end of said passage means operable to permit the water to enter the light;

b. a lamp assembly mounted in said housing at said other end thereof including relfector means, a light bulb supported in said reflector means, and a lens operatively connected to said reflector means operable as a cover therefor;

c. generator means supported in said housing in proximity to said lamp assembly including a multipole magnet and a coil supported for rotation relative to each other, and electrical circuit means connecting said coil and said light bulb in electrical circuit relationship, said multipole magnet being operable to produce a magnetic field, said coil being positioned in said magnetic field wherein when relative rotation between said multipole magnet and said coil occurs an electrical current is produced in said coil and is provided through said electrical circuit means to said light bulb to turn said light bulb ON;

d. a shaft supported coaxially with the major axis of the light in said housing for rotation relative thereto, said shaft having one of said multipole magnet and said coil mounted thereon at one end thereof for rotation therewith; and e. a turbine wheel assembly supported within said housing at said one end thereof including propellor means mounted on said shaft at the other end thereof for rotation therewith, said propellor means including blade means provided on the periphery thereof so as to be in the path of flow of the water flowing through said housing wherein the force of the water striking said blade means is operable to cause said propellor means and thereby said shaft to rotate within said housing.

9. The light as set forth in claim 8 wherein said coil is stationary and said multipole magnet is mounted on said shaft for rotation therewith.

10. The light as set forth in claim 8 wherein said turbine wheel assembly further includes a stator supported in said housing against rotation relative thereto adjacent to said propellor means, said stator having a plurality of blades provided on the periphery thereof extending radially thereof arranged so as to be positioned in the path of flow of the water flowing through said housing wherein the water entering said housing strikes said plurality of blades of said stator and is directed at the most efficient angle against said blade means of said propellor means from whence the water flows through said passage means to said multiplicity of outlet ports exiting therefrom into the swimming pool.

* * * * *